July 7, 1931.  H. J. POLLARD  1,813,814
AIRCRAFT STRUCTURE
Filed Feb. 19, 1930
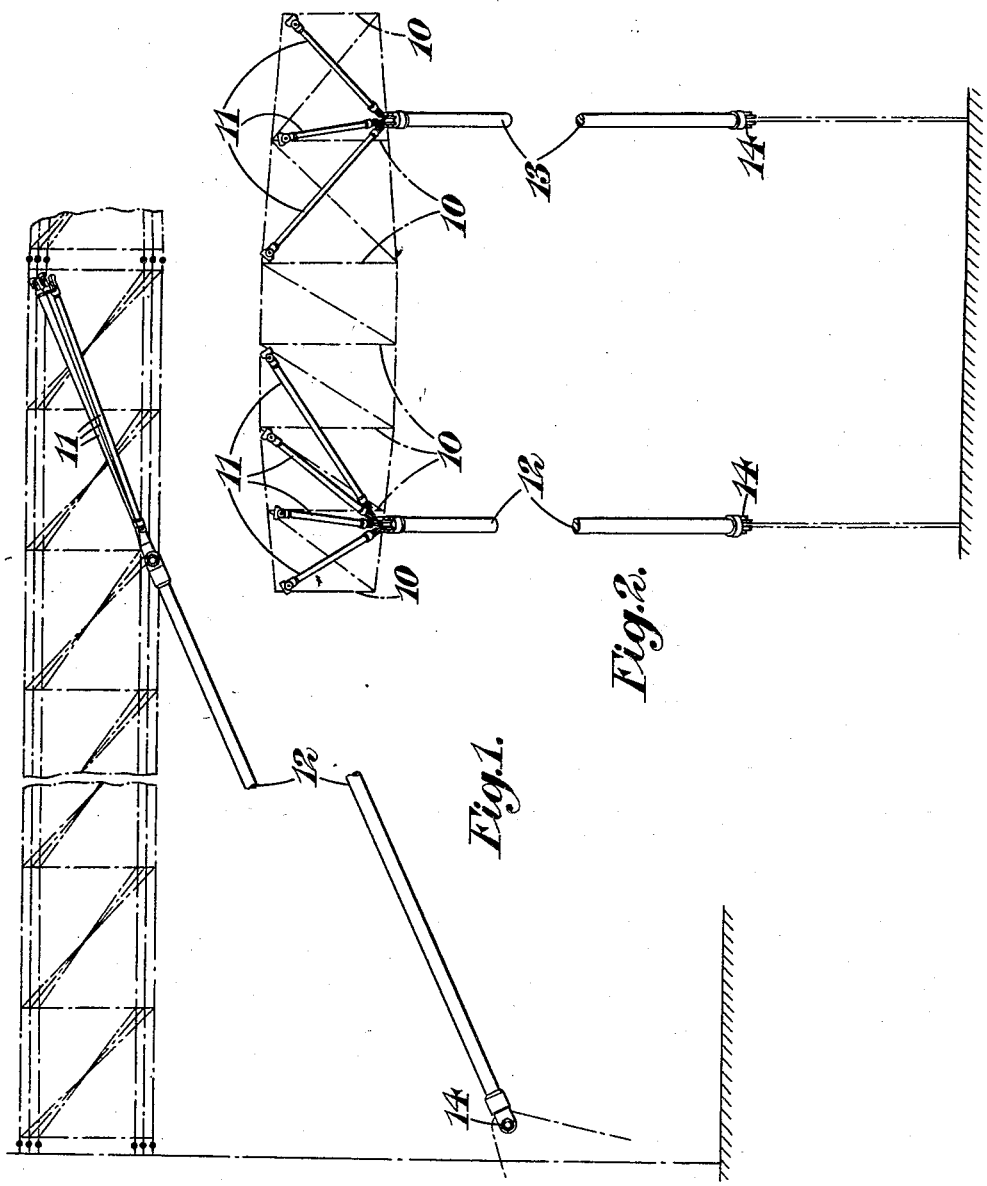
Inventor
Harold J. Pollard
by Wilkinson & Mawhinney
Attorneys.

Patented July 7, 1931

1,813,814

UNITED STATES PATENT OFFICE

HAROLD JOHN POLLARD, OF BRISTOL, ENGLAND, ASSIGNOR TO THE BRISTOL AEROPLANE COMPANY LIMITED, OF BRISTOL, ENGLAND, A BRITISH COMPANY

AIRCRAFT STRUCTURE

Application filed February 19, 1930, Serial No. 429,716, and in Great Britain February 21, 1929.

This invention is for improvements in aircraft structures and is concerned with means for supporting wings, particularly those which comprise a structure built up of a number of spars.

It is not good practice aerodynamically to have as many external bracing members as there are spars, and it is one of the objects of this invention to provide a construction wherein the number of said members per wing may be greatly reduced.

Accordingly the present invention provides a strut or tie for supporting an aircraft structure from without comprising an external part and a plurality of internal parts all engaging the external part (for example, at a common point) within the structure, the free ends of said internal parts being connected to the interior of the structure at such points as may be desired, for the purpose of providing an economic arrangement of external structure.

The external part may be secured to the fuselage or other suitable part of the craft and its other end may be secured to a plurality of internal parts whereof the free ends are secured to the said spars. There may, for example, be one internal part for each spar.

According to a feature of the invention, in a multi-plane structure, the upper planes are each supported on the plane next below it, by external members each of which is connected at both ends to a plurality of internal parts, the other ends of which are secured to various points within their respective planes, for the purpose of reducing the number of external members.

One example of the invention as applied to a supported monoplane wing will now be described with reference to the accompanying diagrammatic drawings wherein:

Figure 1 shows a supported wing structure viewed in a fore-and-aft direction.

Figure 2 is a view looking from the right of Figure 1.

Like reference numerals indicate like parts throughout the drawings.

The wing is built up of seven spars 10 each comprising an upper and lower boom running longitudinally of the wing, the booms being spaced round the periphery of the wing. To each of the upper booms an internal bracing member 11 is secured; the first four of these internal members are brought together just within the lower surface of the wing and secured to a main external member 12, and the remaining three are secured to a second similar member 13. The free ends of the members 12 and 13 are anchored to the fuselage of the machine at 14. Thus, the wing will have only two external supporting members, though the structure is supported at seven points.

The struts themselves may be of any convenient form.

This invention may be employed with advantage in multiplane structures wherein the upper planes are each supported on the plane next below it by struts or ties between the two planes. In this case an external member as above described has a plurality of internal parts attached to each of its ends which are situated within the opposed surfaces of the two planes. For example, the upper plane of a biplane may be constructed in a manner similar to the above described monoplane wing, and the two external members be brought to two attachment points within the lower plane, from each of which a number of internal struts radiate to attachment points in the plane structure. The lower plane may be supported from the fuselage in like manner to the monoplane wing above described. Thus, there will be only two external members between each plane.

Although the above constructions provide for two external members for each plane, it will be obvious that this number may be varied to suit individual cases, depending upon the number of spars in each plane, the weight of the structure, etc. For example, in the case of a very light structure, it might be satisfactory to group all the internal members together and attach one external part thereto.

Other modifications may be made without departing from the scope of the invention: for example, each of the internal members 11 may be secured to the wing structure at more than one point if desired.

I claim:—

1. A strut for supporting an aircraft structure from without comprising an external part, and a plurality of internal parts all engaging the external part within the structure and connected to the interior of the structure at distributed points.

2. A strut for supporting an aircraft structure from without comprising an external part, and a plurality of internal parts all engaging the external part at a common point within the structure, the free ends of said internal parts being connected to the interior of the structure at distributed points.

3. A wing-structure for aircraft comprising a plurality of spars extending longitudinally of the wing, an external strut connected to the fuselage of the aircraft, and a plurality of internal struts each connected to one of said spars and all connected to the external strut at a common point within the structure.

In testimony whereof I affix my signature.

HAROLD JOHN POLLARD.